R. J. ANDERSON.
COMBUSTION APPARATUS.
APPLICATION FILED MAR. 6, 1919.

1,362,212.

Patented Dec. 14, 1920.
9 SHEETS—SHEET 3.

Inventor
R. J. Anderson

R. J. ANDERSON.
COMBUSTION APPARATUS.
APPLICATION FILED MAR. 6, 1919.

1,362,212.

Patented Dec. 14, 1920.
9 SHEETS—SHEET 6.

Witness

Inventor
R. J. Anderson
By
Attorney

R. J. ANDERSON.
COMBUSTION APPARATUS.
APPLICATION FILED MAR. 6, 1919.

1,362,212.

Patented Dec. 14, 1920.
9 SHEETS—SHEET 9.

Inventor
R. J. Anderson

UNITED STATES PATENT OFFICE.

ROBERT JAMES ANDERSON, OF EL PASO, TEXAS, ASSIGNOR TO INTERNATIONAL FUEL CONSERVATION CO., OF PHOENIX, ARIZONA, A CORPORATION OF ARIZONA.

COMBUSTION APPARATUS.

1,362,212.   Specification of Letters Patent.   Patented Dec. 14, 1920.

Application filed March 6, 1919. Serial No. 281,038.

*To all whom it may concern:*

Be it known that I, ROBERT J. ANDERSON, a citizen of the United States, residing at El Paso, in the county of El Paso and State of Texas, have invented certain new and useful Improvements in Combustion Apparatus, of which the following is a specification.

One of the objects of the present invention, stated generally, is the provision of novel means or apparatus for the combustion of fuel to the end that a maximum number of heat units will be derived from a given quantity of fuel and nearly complete combustion will be effected with minimum wastage of heat units, through incomplete combustion of the carbon present, or escape of the unconsumed carbon and heat units to the stack or other outlet of the furnace. The combustion means or apparatus, in its broadest aspect, is adapted for the generation of heat to be put to any useful purpose such, for instance, as the firing of a steam boiler or heating plant, the treatment of ore and chemicals, melting of metal in foundry cupolas, or for any other purposes.

My object is to provide improved combustion means or apparatus adapted to introduce the fuel and air into the combustion chamber under such nice regulation that substantially all of the carbon of the fuel and the oxygen of the air will unite in such manner as to minimize possibility of excess oxygen and whereby there is insured liberation of substantially all of the heat units which may be derived from the union of the fuel and air. The novel means employed causes commingling of the oxygen of the air and the fuel in such manner that not only the exterior of the body or mass of the flames of combustion is involved, but also the interior thereof, thus materially differing from combustion apparatus heretofore known to me, in that earlier combustion apparatus has provided only for development of heat units at what may be termed the exterior of the body or mass of flame, with the presence of air in such excess that portions only of the interior of the mass of flame have been converted into $CO_2$ although the exterior of the body of the mass of flame may have been converted into $CO_2$.

As distinguished from combustion apparatus heretofore known to the art of which I have knowledge, my invention comprises novel means for carrying on combustion wherein conversion of substantially all of the fuel and oxygen into $CO_2$ is effected, resulting in substantially perfect combustion, whereas in earlier combustion apparatus, due to lack of proper means for the regulation, proportioning, and commingling of the fuel and the oxygen of the air, only a portion of the carbon and oxygen has become converted into $CO_2$, the remainder performing its work inefficiently, occasioning a very great wastage and increased consumption thereof.

A still further object is the provision of a furnace for the smelting of ores which has novel means for effecting combustion by the interaction and union of air and finely divided fuel, whether in fluid or gaseous hydrocarbon form, or of pulverized coal, coke or other carbonaceous material, to the end that there will be no excess of oxygen and, consequently, the heat derived from such combustion may be introduced directly into a body of ore and the latter smelted thereby without necessitating following the common practice of preliminarily mixing fuel with the ore before it is charged into the furnace; additional fuel, however, may be added to the ore, if desired.

My combustion apparatus effects the complete union of air and fuel and the elimination of the excess of oxygen heretofore considered to be necessary to supply to the body of ore being smelted for the purpose of combining with the carbonaceous material mixed with the ore charge, and eliminates this unnecessary, wasteful, and efficiency-reducing step of introducing air in unnecessary volume. My invention, aside from being susceptible of use for the production of heat for any purpose whatsoever, is, also, adapted to carry on combustion for the smelting of ore.

In the utilization of my novel means for smelting copper ores, as no metallurgical features or chemical reactions are involved, no further step is necessary as the heat derived from combustion is directly introduced into the furnace to melt and liquefy the charge to allow the metal to separate by gravity from the slag.

In the smelting of lead and iron ores, however, as it is necessary to not only develop heat in sufficient volume to melt the ore but, also, to deliver to the ore charge an excess of carbon for the purpose of combining with the oxygen liberated from the ore undergoing smelting and deoxidization, my invention has, for a further object, the provision of novel additional means for carrying on, in a blast furnace, a secondary combustion which will produce an excess of carbon for delivery to the charge.

My invention, as applied to the reduction of iron and lead ores therefore contemplates the provision of separate primary and secondary apparatus, the primary means or apparatus effecting substantially complete conversion of the fuel into heat units which are directly conveyed to the ore body, while the other, supplemental or secondary, combustion apparatus has means for combining air and fuel in such proportion that there is an excess of carbon, the gas evolved being carbon monoxid (CO) which is directly introduced into the ore body for the purpose of satisfying, by the excess of carbon thus derived from the secondary combustion process, the oxygen liberated from the ore thereby accomplishing the reduction and deoxidization thereof.

By delivering the $CO_2$ gases derived from my main combustion apparatus and the CO gases derived from my secondary combustion apparatus directly into a body of iron ore in a blast furnace, iron or steel of different grades may be directly produced, according to air and fuel regulation under the process. Similarly, metallic lead may be directly smelted out of lead ore.

My combustion apparatus will effect economies in foundry cupolas for melting of cast iron and scrap to be used in making castings. My combustion chamber is applied to the cupola, fuel oil, gas, powdered coke, or powdered coal being used. Inasmuch as the melting of cast iron and scrap in a foundry cupola requires a lower temperature than that necessary for the smelting of ore, an additional saving may be accomplished by so regulating the fuels and air used in the combustion chamber as to produce a slight excess of carbon and eliminate the losses which now occur by oxidizing atmosphere in the furnace. The heat units derived from combustion are delivered direct to the material to be melted.

When the invention is used for the production of heat for a steam boiler, the apparatus embodies a combustion chamber and novel means, elements and instrumentalities for effecting substantially complete liberation from the fuel of all the available heat units and the delivery to the boiler of the $CO_2$ gases derived from combustion, as previously set forth.

My invention is well adapted for use in furnaces or kilns for the conversion of heavy chemicals into other forms, for instance, the conversion of sodium sulfate to sodium sulfid in an inclined tubular rotary furnace or kiln wherein the rotation of the kiln or furnace causes the sodium sulfate to continuously rise up the upwardly turning interior wall of the kiln or furnace and to fall vertically, while advancing steadily in the direction of the length of the furnace or kiln. In the conversion of sodium sulfate to sodium sulfid the chemical reactions and conversions are effected at a temperature of about 960° C., at which temperature the product becomes soft and pasty and in condition for conversion which can only be accomplished in the presence of excess carbon in the gases and not in an oxidizing or neutral atmosphere. If the temperature exceeds the critical point, the product becomes rapidly fused, liquefying, and adhering to the sides of the furnace and forming sodium silicate by union with the furnace lining.

In utilizing my invention in the manufacture of sodium sulfate, complete and accurate control of both the furnace temperatures and tenors of the gases, is obtained.

As with the practice of the invention in connection with an iron blast furnace, primary and secondary combustion apparatus is used, the CO gases from the secondary combustion apparatus being discharged into the end of the rotary kiln or furnace so as to direct the flames of the reducing gases in close contact along the line and top of the advancing charge of the sodium sulfate at a time when the material has reached the temperature requisite for conversion into sodium sulfid. The gases ($CO_2$) produced in the primary combustion apparatus, heat the walls of the rotary furnace or kiln, and by radiation from these walls furnish in the interior of the rotary furnace or kiln, a volume of neutral heated gases, insuring accurate, complete and definite control of the product and effecting economy in the use of fuel. As a result of the use of the combined primary and secondary apparatus, there is a constant discharge of sodium sulfid from the delivery end of the rotary kiln, and, consequently, a direct, automatic and continuous process of conversion of sodium sulfate into sodium sulfid, is had. This obviates two troublesome and expensive steps formerly required, namely, leaching of the roasted product, decanting and settling the liquors; and, the second step of evaporation of the liquid solutions down to the finished commercial product.

Other applications of my combustion apparatus may be made: for instance, it may be used in the manufacture of Portland cement, which is accomplished in rotary kilns; also, in the manufacture of glass in glass furnaces where the temperatures and tenors of the gases should be under definite control.

In my invention combustion is carried on and completed in a closed chamber or chambers, the heat units from combustion being led from the combustion chamber to the point of utilization. A smokestack or chimney is eliminated when my process is practised, in so far as the utilization of the same has been heretofore had for the purpose of the creation of draft and furnishing air for combustion. The sole function of the chimney or smokestack, when used in connection with my combustion apparatus, is for the reception of waste gases and products of combustion after useful work has been performed, and conveying the same to a suitable elevation and then dissipating them into the air.

No particular size or proportions of the combustion chamber used in my primary and secondary combustion apparatus is necessary, the size and proportions being determined by the size and nature of the installation in connection with which my process of combustion is used.

My combustion apparatus has means whereby there is jetted, sprayed, or otherwise forced or introduced into a closed combustion chamber, at an angle, preferably nearly a right angle, to the direction of final travel of the gases derived from combustion as they flow toward their point of utilization, numerous streams of air and fuel which play across or intersect at a very great number of points. The fuel may comprise finely divided coal, coke, or other solid carbonaceous material, or may be any hydrocarbon or gaseous fuels. Whatever fuel is used, it will be introduced into the combustion chamber in connection with air or steam jets under pressure in a manner whereby not only the exterior of the body or mass of flame derived from combustion will be converted into $CO_2$, but the entire interior of the mass or body of flame will be similarly converted instead of escaping, as has heretofore been the case, in the form of incompletely combusted carbon and, instead of a large percentage of the fuel passing off as waste without liberation of heat units, substantially the entire body of fuel introduced within the combustion chamber will combine with the oxygen of the air jets, all of which results in liberation of a maximum number of heat units with a minimum of uncombined carbon and oxygen.

The introduction of the jets or sprays of air and fuel into the combustion chamber is not restricted to any particular means. However, to insure as nearly perfect combustion as may be possible, I prefer to jet or spray the fuel in under suitable pressure and to disseminate the air throughout the cross-playing streams of fuel by forcing it in through perforated tubes of refractory material, or like distributing devices, located within the combustion chamber, the jets or streams of fuel playing crosswise relative to the tubes and, in turn, being shot through and through by the oxygen derived from the numerous fine jets of air issuing from said tubes.

The cross-jetting of the fuel and air at an angle, preferably nearly a right angle, to the direction of final travel of the gases derived from combustion as they flow toward their point of utilization, accomplishes an important function in effecting substantially complete combustion. Instead of projecting the fuel at high velocity toward the point whence the products of combustion are to pass to the point of utilization thereof as has heretofore been the common practice and by which the proper development or liberation of the heat units from the fuel is prevented, my new combustion apparatus insures the retention of the gases in the combustion chamber until the complete admixture of the oxygen and the carbon is accomplished and the heat units fully liberated. The full volume of gases remains in the combustion chamber until these gases are forced from the combustion chamber by the pressure of the expanded gases developed therein.

The embodiments of my novel combustion apparatus, and the uses thereof which are specifically described hereinafter and are shown in the accompanying drawings, are disclosed to illustrate the principle thereof and are not to be considered either as limiting the forms the invention may assume, or the uses to which it may be put.

In the accompanying drawings.

Referring to Figs. 1, 2, 3, 4, there is shown a furnace for the smelting of copper ore. The upright water jacketed shell 1 is of the usual form, mounted on a refractory base 2 and provided with a molten metal spout 3 and a slag spout 4 for the usual purposes of drawing off the copper matte and the slag. These spouts will be plugged with clay, in the usual manner. The charge of copper ore appears at 5, the slag is shown at 6, and the molten matte at 7. Closed combustion chambers 8 and 9 extend the width of the base 2 and are of refractory material. These chambers are not limited as to their dimensions which are determined by the constructing engineer according to the size of the furnace and for the purpose of enabling combustion, as hereinafter explained, to be effected, which will be adequate for the purpose of smelting the ore.

A suitable number, three being shown, of twyers 10 afford communication between the combustion chambers 8 and 9 and the interior of the furnace shell 1. These twyers are of the ordinary form, their ends being sealed by fire clay 11 where they enter the tops of the combustion chambers 8 and 9, and the fire clay 12 where they enter the walls of the furnace 1. Fire clay plugs 13 may be employed and, when removed, permit inspection of the charge 5.

Figures 1, 2:
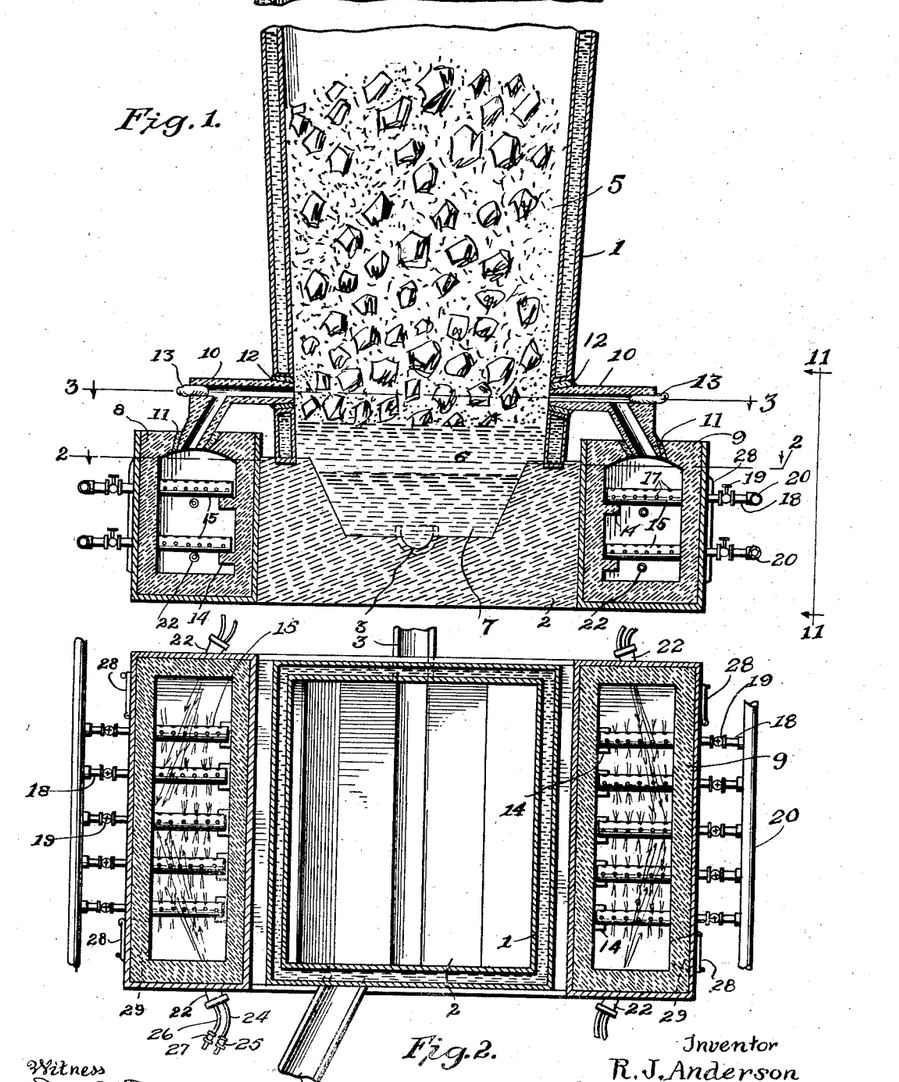
Figure 1 is a vertical section of a furnace for smelting copper which is provided with my combustion chambers.
Fig. 2 is a horizontal section on the line 2—2 of Fig. 1.
Figure 3:
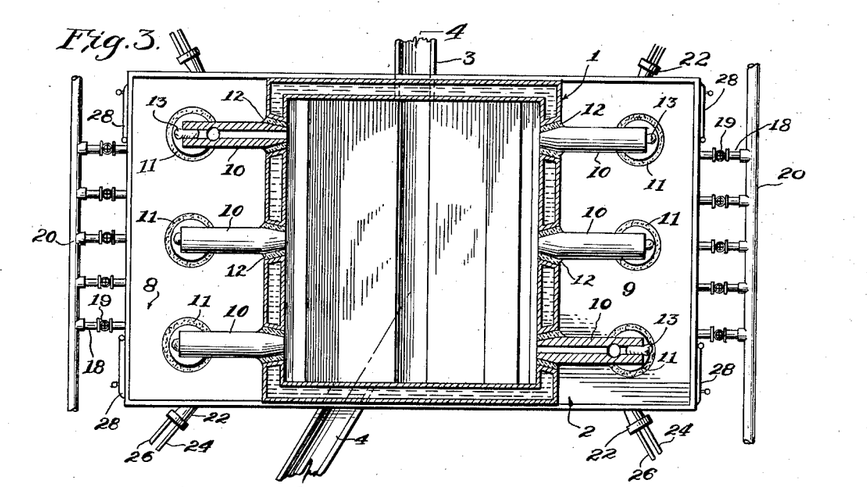
Fig. 3 is a horizontal section on line 3—3 of Fig. 1.
Figure 4:
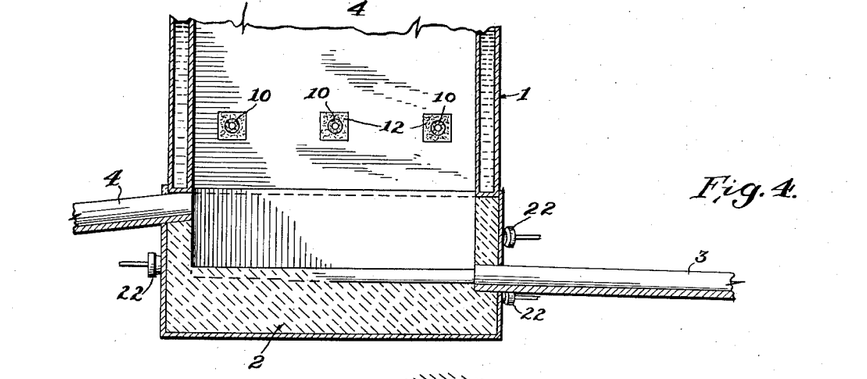
Fig. 4 is a detail vertical section on line 4—4 of Fig. 3.

The chambers 8 and 9 are sealed from the outer air and have no outlet except the twyers 10. The oxygen supplied to the interiors of the chambers 8 and 9 is that which is derived solely from air jetted or sprayed inside the chambers 8 and 9.

Figure 11:
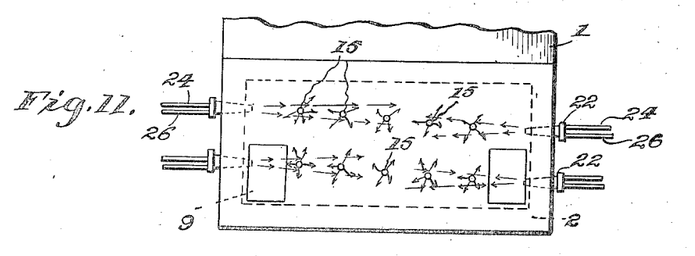
Fig. 11 is a detail elevation on line 11—11 of Fig. 1 illustrating the interaction of the fuel and air jets in the primary combustion chambers.
Figure 18:
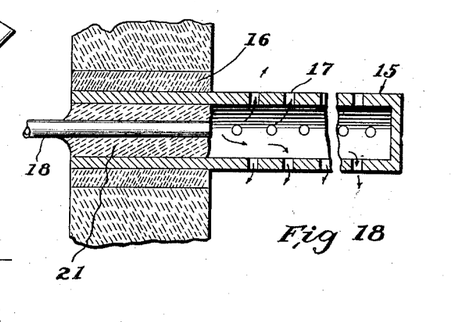
Fig. 18 is a detail section illustrating the manner of securing one of the refractory air distributing tubes.

Extending across the combustion chambers, and suitably supported as at 14, are a number of nozzles or air distributing tubes 15 of some suitable refractory material. These tubes or distributers extend through the wall of the combustion chamber and are sealed therein by fire clay 16, Fig. 18. The tubes or pipes 15 are provided with numerous openings or perforations 17 which are relatively small so that the air will issue therefrom substantially at right angles to the lengths of the tubes 15 in the form of numerous fine jets or sprays as indicated, for instance, in Fig. 11. As many of the air distributers 15 as may be desired, or as may be found necessary, can be used. In Figs. 1, 2 and 11 I have shown two rows thereof, at different levels, but in other forms of apparatus, as shown in other figures of the drawings, a greater number of these air distributers are disclosed. The air distributers receive air in suitable volume and under suitable pressure, from pipes 18, each pipe having a valve 19 to control the admission of the air; the pipes 18 may receive their air from any suitable source, such, for instance, as feed pipes 20. The pipes 18 are sealed where they enter the distributers 15 by fire clay wads 21, Fig. 18. The air distributers 15 of the respective rows, are arranged in stepped or staggered formation for a purpose which will presently appear.

Figure 5:
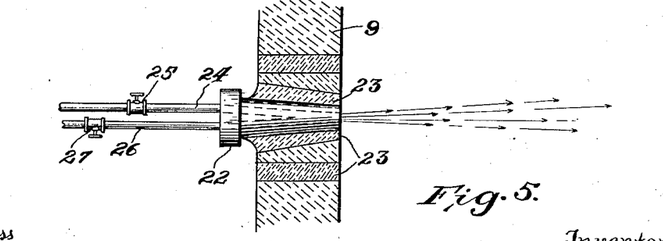
Fig. 5 is a detail section showing one of the nozzles for injecting the fuel, and the manner in which it is sealed in the wall of the combustion chamber.

The fuel is jetted or sprayed into the combustion chambers 8 and 9 in finely divided form. Such fuel may comprise finely divided coal, coke, or other solid carbonaceous material, or may be any hydrocarbon or gaseous fuel. I have illustrated how a hydrocarbon oil may be jetted or sprayed into the combustion chambers 8 and 9 by the use of ordinary air or steam pressure nozzles, in the various disclosures of apparatus used in practising my primary combustion process, but it is to be understood that any suitable, or preferred, means for jetting or spraying any fuel which may be used, can be employed for this purpose. In Fig. 5 there is shown an ordinary jetting or spraying nozzle or distributer 22 which may be suitably sealed in the wall of the combustion chamber by fire clay 23. The fuel, for instance hydrocarbon oil, is introduced to the nozzles through pipes 24 having valves 25 connected to any suitable source of supply. The air or steam for spraying the oil is introduced to the nozzles by pipes 26 having valves 27.

Referring to the copper ore furnace of Figs. 1, 2, 3, 4, and to the relative arrangement of the fuel and air distributers, as shown in Fig. 11, the fuel distributing nozzles 22 are so located that they will cause the fuel to be jetted or sprayed in finely divided form crosswise or at an angle to the lengths of the air distributers 15, and crosswise in relation to the air jets issuing from the perforations 17. The cross play of the finely divided fuel jets and the direction of play of the air jets issuing from the perforations 17 is, also, at an angle, preferably nearly a right angle, to the direction of final travel of the gases derived from combustion as they flow toward their point of utilization. In other words, the cross play or interaction of the jets or sprays of fuel and the jets of air from the distributers 15, instead of being in a direction toward the outlets from the combustion chamber as has heretofore been proposed, and which has resulted in incomplete combustion and great waste, is in my combustion apparatus; at an angle to the direction of final travel of the gases and consequently the fuel jets and air interact to effect substantially complete combustion and substantially complete liberation of the heat units before the flow of gases to be subsequently utilized proceeds toward the outlet or outlets from the combustion chamber. Consequently, a result is obtained, due to the cross play and interaction of the fuel and oxygen derived from the air jets to the end that not only the exterior of the body or mass of flame derived from combustion is converted into $CO_2$ but, also, the entire interior of the mass or body of flame is thus converted. The staggered relationship of the rows of air distributers 15 to the nozzles 22 insures that the air issuing from the perforations 17 of each air distributer 15 will form a complete admixture with the jetted or sprayed fuel from the nozzles.

Doors 28 are provided for suitable openings 29 in the combustion chambers 8 and 9 through which the fuel may be initially ignited by suitable means.

The valves 19, which control the supply of air to the distributers 15, and the valves 25 and 27, which control the spraying of the fuel, enable any desired regulation to be had so that the invention may be used in connection with any furnace, kiln, boiler, or other installation, according to requirements.

Figure 6:
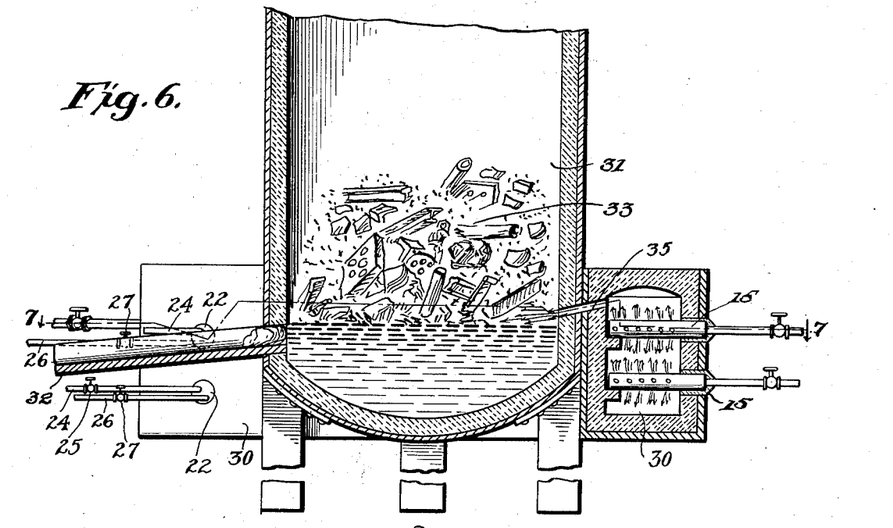
Fig. 6 is a vertical section of foundry cupola equipped with my combustion chamber.
Figure 7:
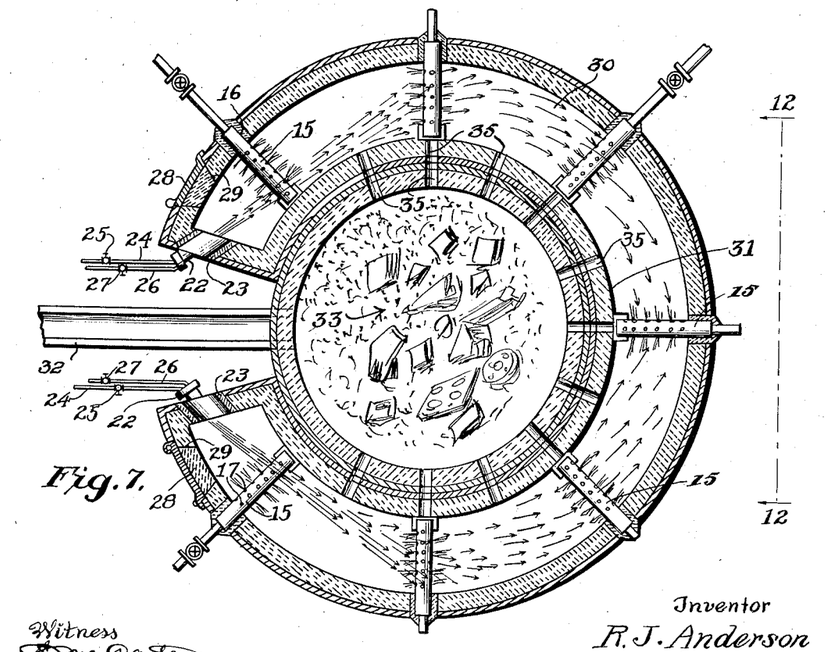
Fig. 7 is a horizontal section on the line 7—7 of Fig. 6.
Figure 12:
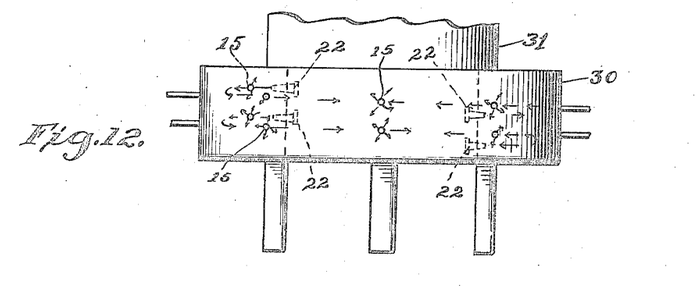
Fig. 12 is a detail elevation on line 12—12 of Fig. 7 in connection with a foundry cupola as shown in Figs. 6 and 7.
Figures 13, 14:
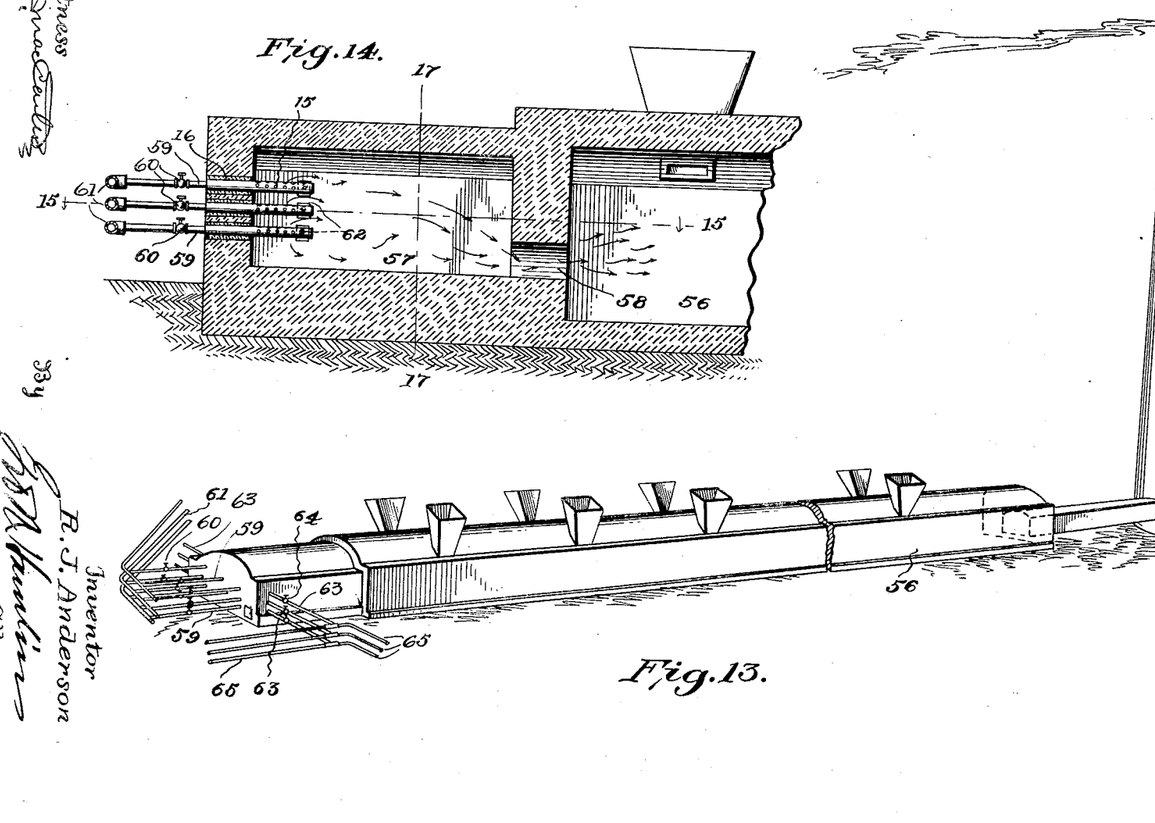
Fig. 13 is a perspective of a reverberatory furnace equipped with my primary combustion apparatus.
Fig. 14 is a detail vertical, longitudinal section through the combustion chamber of the reverberatory furnace of Fig. 13.
Figure 15:
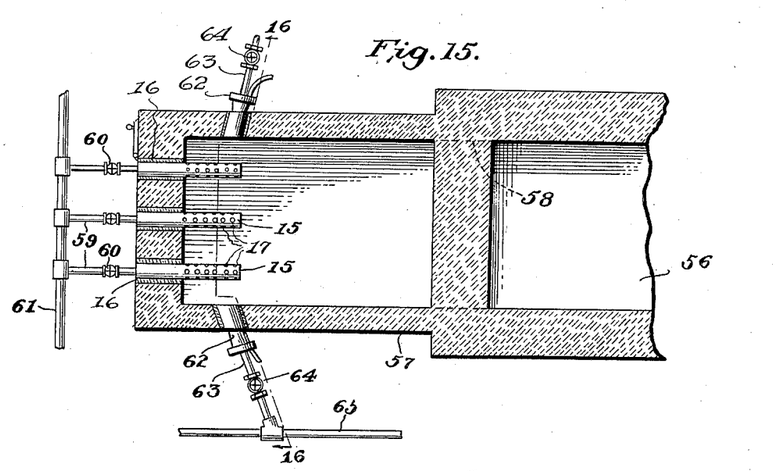
Fig. 15 is a horizontal section on the line 15—15 of Fig. 14.
Figure 16:
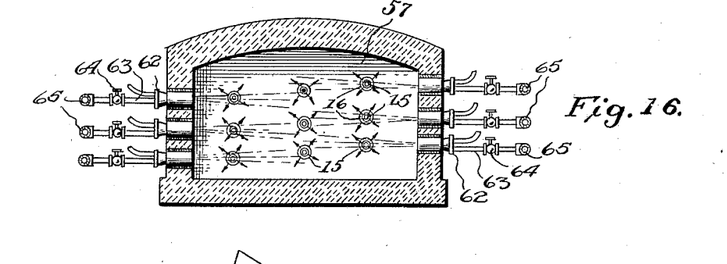
Fig. 16 is a vertical section on the line 16—16 of Fig. 15.
Figure 17:
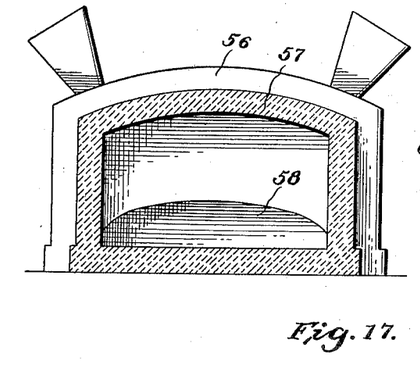
Fig. 17 is a vertical section on the line 17—17 of Fig. 14.

Figs. 6, 7 and 12 illustrate my invention embodied in a foundry cupola used for melting cast iron and scrap. In this apparatus not only will the fuel cost be lowered, but as a lower temperature will accomplish the melting of the cast, than those temperatures, such as are required for smelting ore, an additional saving will be obtained by so regulating the fuel and the air as to produce a slight excess of carbon, thereby eliminating the losses which occur under present foundry cupola practice by reason of an oxidizing atmosphere in the furnace.

In Figs. 6 and 7 I have shown a single combustion chamber 30 but a plurality of combustion chambers could be employed, if preferred. The molten metal may be run off from the cupola 31 through a spout 32. The castings or scrap undergoing melting is shown at 33 and the molten metal at 34. The same form of air distributers 15 as previously described in connection with the furnace of Figs. 1, 2, 3, 4, is used on the cupola of Figs. 6 and 7. Air is admitted under valved regulation, as before. The air distributers are arranged in rows in step formation or staggered relation at different points of the combustion chamber as shown in Fig. 12. The gases derived from combustion are admitted directly into the metals 33 through twyers 35 at various points as shown in Fig. 7. The fuel is sprayed, in the manner before described and under valved regulation, into the combustion chamber 30. The nozzles 22 are shown in Fig. 7 as located at the ends of the nearly complete circularly arranged combustion chamber 30, but additional nozzles for jetting in the fuel might be located at other points provided the fuel is sprayed or jetted in crosswise relation to the air distributers as previously explained. As many nozzles 22 may be employed as desired. As shown in Fig. 6, there is preferably a plurality of nozzles, one above the other, at each end of the combustion chamber 30.

Figure 8:
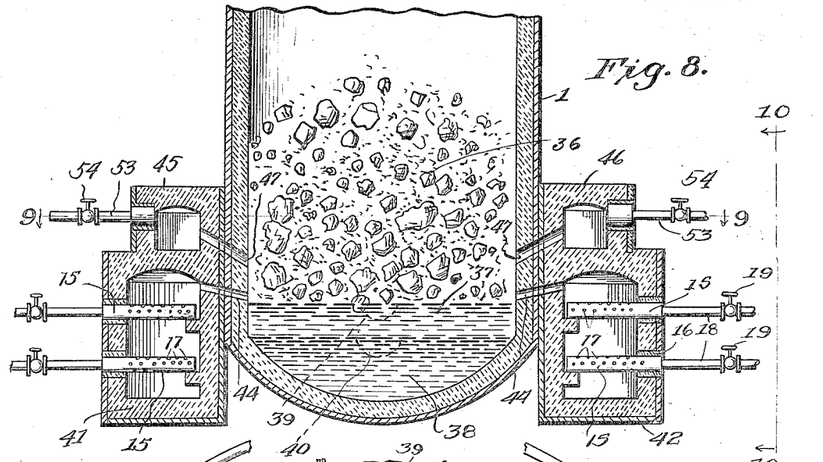
Fig. 8 is a vertical section of my improved blast furnace for the smelting of iron ore, having primary and secondary combustion chambers.
Figure 9:
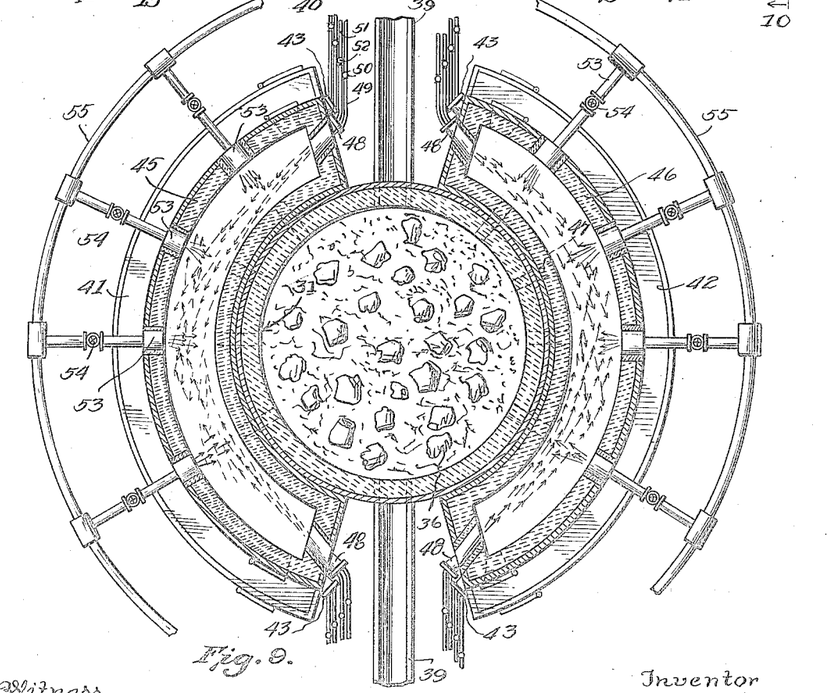
Fig. 9 is a horizontal section on the line 9—9 of Fig. 8.
Figure 10:
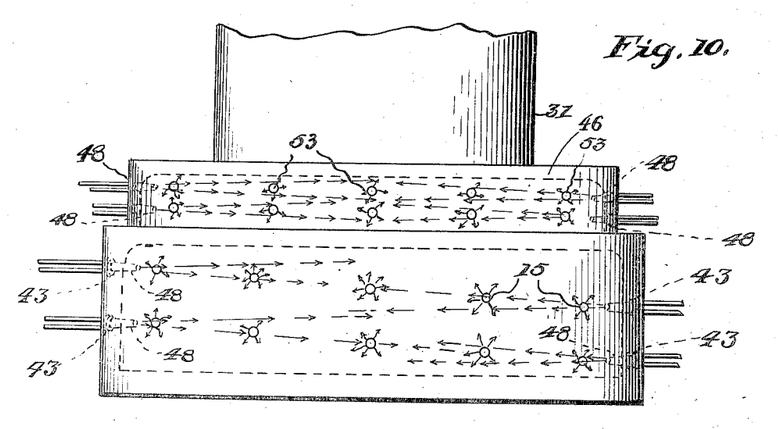
Fig. 10 is a detail elevation on the line 10—10 of Fig. 8 illustrating the interaction of the fuel and air jets in carrying out primary and secondary combustion.

In Figs. 8, 9, 10 the apparatus is embodied in a blast furnace for smelting iron ore or lead ore. In smelting iron ore or lead ore, as it is necessary to not only develop heat sufficient to melt the ore but, in addition, deliver to the ore charge an excess of carbon for the purpose of combining with the oxygen liberated from the ore, my invention, when thus applied, involves secondary combustion means in addition to my novel primary combustion means. Primary combustion is carried on as previously described and the $CO_2$ gases derived therefrom are used for melting the ore. In addition, secondary combustion is carried on in which air and fuel are combined in such proportion that there is an excess of carbon, the gas evolved being carbon monoxid (CO) which is directly introduced into the body of ore and combines with the oxygen liberated from the ore, thereby accomplishing the reduction and deoxidization of the ore.

The ore charge appears at 36, the slag is shown at 37 and metallic iron, or lead, at 38. The usual slag spout 39 and metal spout 40 are provided. The primary combustion chambers are shown at 41 and 42. These may be arc shaped and surround the furnace shell 1 as far as possible. The air distributers 15 are of the same form, arrangement, and have the same function as previously described. The fuel for the primary combustion chambers 41, 42 is jetted or sprayed by nozzles 43 located at the ends of the chambers 41 and 42 and in sufficient number and arrangement to carry out, in connection with the air distributers 15, primary combustion, as previously explained. The $CO_2$ gases pass from the combustion chambers 41 and 42 through twyers 44 into the ore charge 36. As thus far explained, combustion is carried on and utilized as previously described in connection with the copper furnace of Figs. 1–4. In smelting iron and lead ores, however, it is necessary to provide, in addition to the $CO_2$ gases required for melting, an excess of carbon to be introduced into the ore to satisfy the oxygen liberated therefrom.

Secondary combustion chambers 45, 46 which may be superposed on the combustion chambers 41, 42, are provided for furnishing the necessary CO gases. These chambers may be of arc shape as shown in Fig. 9, and very nearly surround the furnace shell. Twyers 47, leading from the chambers 45 and 46 at suitable points, deliver the CO gases derived from combustion carried on in said chambers, into the body of the ore 36 to combine with the liberated oxygen therein. In effecting this secondary combustion, the carbon bearing fuel is jetted or sprayed into the chambers 45 and 46 by suitable means, such as nozzles 48 to which the fuel is delivered by a pipe 49 having a suitable valve 50. The fuel is injected into the combustion chambers 45 and 46 by air or steam supplied by pipes 51 having suitable valves 52. The air is introduced into chambers 45, 46 from nozzles 53 under suitable valve control 54 and supplied by any suitable air feed pipe 55. Air distributers, such as shown at 15, are dispensed with and the air jetted in directly from the nozzles 53, as shown in Fig. 9. In effecting combustion in the chambers 45 and 46 the regulation of air and fuel is such that an excess of carbon is developed from the combustion and as a result the gases derived from the secondary combustion are in the form of carbon monoxid (CO) and pass through the twyers 47, the excess carbon combining with the oxygen liberated from the ore 36 under the smelting action effected by the $CO_2$ gases which pass through the twyers 44.

With the exception that CO gas is evolved in the combustion chambers 45, 46, the action of the secondary combustion chambers is the same as in chambers 41 and 42, as to cross play of the fuel and air jets in relation to each other and the cross play of both fuel and air jets in relation to the direction of final travel of the gases derived from combustion, such gases passing out through the twyers 47. The cross play of the fuel and air jets in the chambers 41, 42 is shown in Figs. 9 and 10. The staggered or step relation of the air jet nozzles 53 in relation to the fuel nozzles 48 is shown in Fig. 10 and in that figure the staggered relationship of the air distributers and fuel nozzles for the primary combustion chambers, is also shown.

In Figs. 13, 14, 15, 16 and 17 there is shown a reverberatory furnace equipped with my combustion chamber and apparatus. The reverberatory furnace proper appears at 56 and the combustion chamber is shown at 57, the two being connected by a flue or passage 58 through which the $CO_2$ gases pass into the furnace 56 and into contact with the ore therein. Combustion is carried on in the chamber 57 in the same manner and by the same means as in the primary or main combustion apparatus heretofore described. The air distributers 15 are fed by air in pipes 59 under suitable valve control 60 and receive air from pipes 61. The fuel distributing nozzles 62 receive fuel from pipes 63 under suitable valve control 64; pipes 65 supply the fuel to the pipes 63. The play of the fine sprays or jets of air and fuel is the same as previously described, the combustion being substantially completely developed in a crosswise or angular relation to the path of travel of the $CO_2$ gases evolved from combustion, the latter flowing toward the flue 58. By the application of my combustion apparatus to a reverberatory furnace, instead of the flames developed in this class of furnace carrying off a large percentage of unconsumed fuel, as has heretofore been the case, the substantially complete liberation of heat units from the fuel in the combustion chamber 57 prevents this waste.

Figures 19, 20:
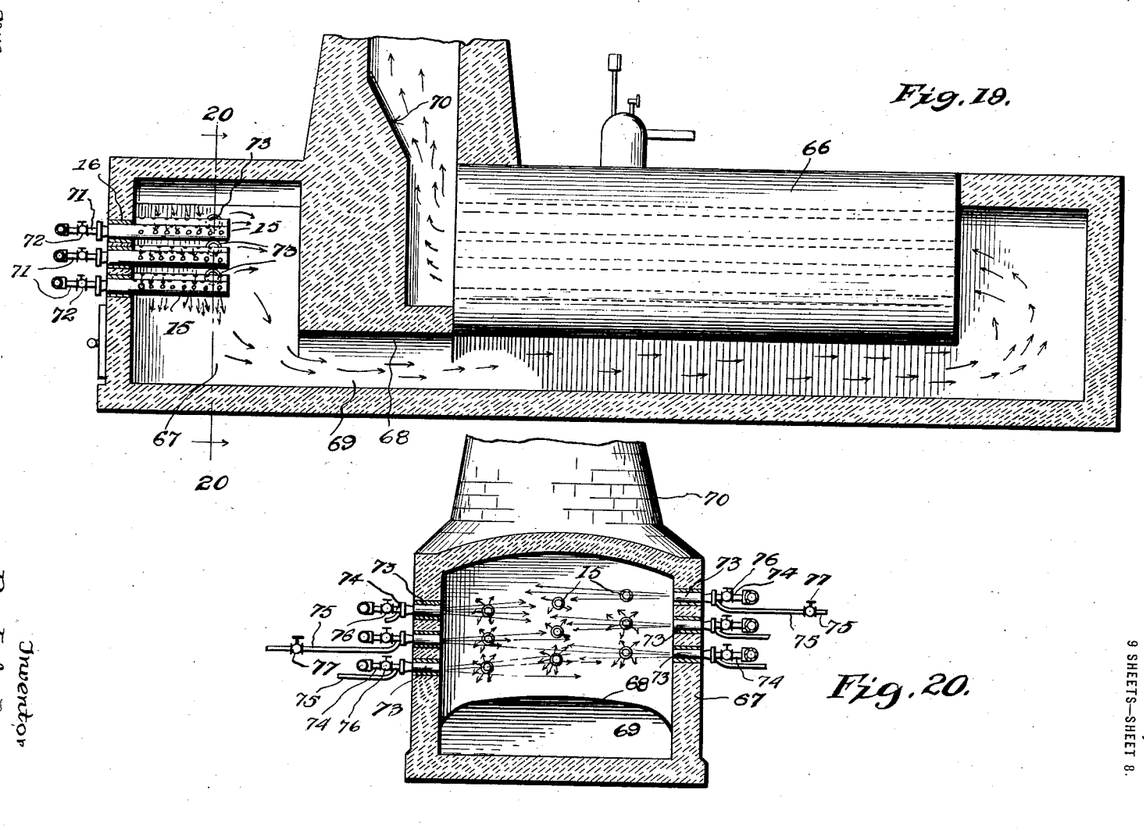
Fig. 19 is a vertical section of a steam boiler furnace equipped with my primary combustion apparatus.
Fig. 20 is a vertical section on the line 20—20 of Fig. 19.

In Figs. 19 and 20 there is shown the application of an apparatus for generating heat for a steam boiler. The boiler appears at 66 and the combustion chamber is shown at 67. The products of combustion pass from the combustion chamber 67 under an arch 68, through a flue 69 to the boiler, thence returning through the boiler flues, to the chimney or smokestack 70. Combustion is carried on by cross jetting of the fuel and air in the manner previously described in connection with my main combustion apparatus. The air issues in numerous fine jets from the air distributers 15 which are supplied by air from pipes 71 having valves 72 for controlling the air supply. The fuel nozzles 73 are supplied with fuel and air through pipes 74 and 75 through suitable valve controls 76, 77. The air distributers 15 are arranged in step or staggered relation as shown in Fig. 20.

Figure 21:
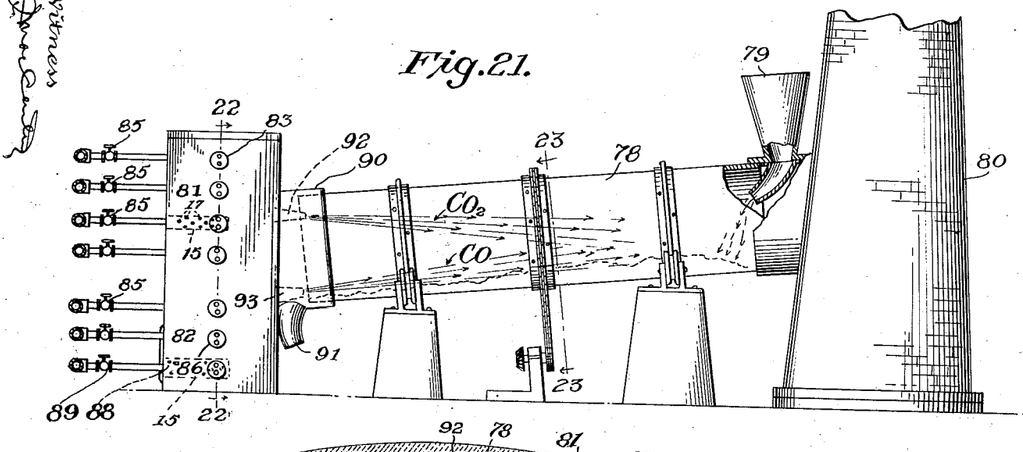
Fig. 21 is a side elevation of a rotary kiln or furnace for the conversion of heavy chemicals into another form, equipped with primary and secondary chambers.
Figure 22:
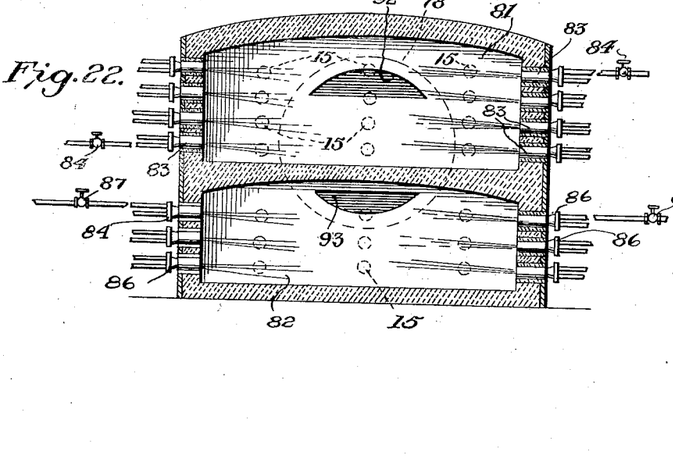
Fig. 22 is a vertical section through the primary and secondary combustion chambers on the line 22—22 of Fig. 21.
Figure 23:
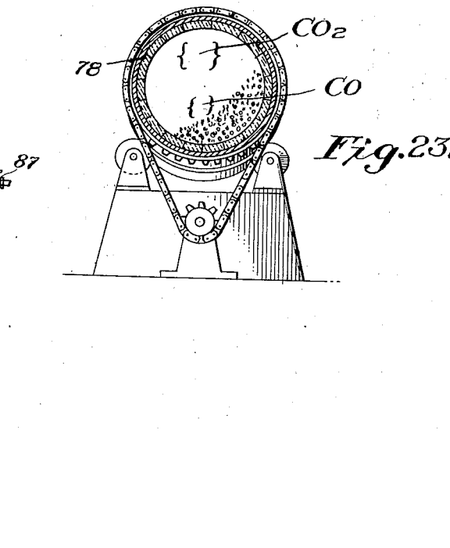
Fig. 23 is a section on the line 23—23 of Fig. 21.

Referring to Figs. 21, 22 and 23, I have illustrated apparatus adapted for use in connection with a rotary kiln or furnace such as commonly used for the conversion of heavy chemicals from their original into other forms. The apparatus illustrated is adapted particularly for the practice of the process in converting sodium sulfate to sodium sulfid. The rotary kiln or furnace 78 is of a well known form and receives the material in any suitable manner as, for instance, through a feed chute or hopper 79. The chimney for the furnace is shown at 80. My primary combustion chamber appears at 81 and the secondary combustion chamber is shown at 82. For convenience of delivery of the gases from the respective combustion chambers to the points where they are used within the rotary furnace or kiln 78, their arrangement is inverted from that shown in Figs. 8 and 9. Combustion is carried on in the main and secondary combustion chambers 81, 82, by the same means and in the same manner as in the blast furnace of Figs. 8, 9. The fuel is jetted or sprayed into the combustion chamber 81 by nozzles or other means 83, under suitable valve control 84. The air is jetted or sprayed from air distributers 15 in the chamber 81 under suitable valve control 85. The play of the finely divided fuel and the air jets issuing from the distributers 15 is crosswise of each other in the chamber 81 and results in full liberation of the heat units in said chamber, in a direction crosswise to the direction of travel to the point of use in the rotary kiln or furnace 78.

In the combustion chamber 82 the fuel is introduced by nozzles 86 under valve control 87. The air is introduced at 88 under valve control 89, the purpose being to provide excess carbon in the chamber 82, just as provided in the combustion chambers 45 and 46. The cross play of the fuel and air in the chamber 82 is on the same principle as in the chambers 45 and 46 and the commingling of the fuel and air is in a direction crosswise to the flow of the CO gas to the point of use in the rotary furnace 78.

A collar or hood 90 surrounds the delivery end of the furnace or kiln 78 and has a suitable outlet 91 for the sodium sulfid. A flue or outlet 92 directs the $CO_2$ gases from the combustion chamber 81 into the delivery end of the rotary furnace 78 to the point designated "$CO_2$," Figs. 21 and 23. A flue or outlet 93 directs the CO gases from the combustion chamber 82 into the rotary furnace or kiln 78 in the general region designated "CO," Figs. 21 and 23.

In the product of sodium sulfid from sodium sulfate the chemical reactions occur at about 960° C., at which temperature the product becomes soft and pasty, permitting conversion. This conversion can only be accomplished in the presence of excess carbon in the gases and not in an oxidizing or neutral atmosphere. Care should be taken that the temperatures do not rise above the point indicated as the product would rapidly fuse and adhere to the furnace lining, forming sodium silicate, if the temperatures go up.

The CO gases from the secondary chamber 82 discharge in close contact along the line and on top of the advancing charge of material as indicated at "CO." This occurs when the material has reached the temperature necessary to effect conversion, the revolutions of the furnace 78 constantly turning the material over and exposing all portions of the mass to the action of the reducing gases. The conversion of the product from sodium sulfate to sodium sulfid is almost instantaneous when contact is had with the carbon in the gases at proper temperatures. The constant discharge of the converted material makes the conversion of the material practically automatic and continuous.

Combustion in the upper or main chamber 81 furnishes $CO_2$ gas to the interior of the rotary furnace 78 as indicated "$CO_2$," affording the heat required for the radiation from the walls of the furnace 78. The gases from the primary and secondary combustion chambers produce a high class product of sodium sulfid and there are obviated two troublesome and expensive steps heretofore necessary, to wit, leaching of the roasted product, decanting and setting the liquors; and secondly, evaporation of the liquid solutions of the finished commercial product.

While I have illustrated certain applications of my primary and secondary combustion apparatus, this is done by way of illustration of the scope of the invention and not in limitation thereof as many other applications thereof may be had, among which are the conversion of sodium sulfate into sodium oxid where lime is added, and the manufacture of Portland cement, in kilns such as shown in Figs. 21 to 23 and in the manufacture of glass in glass furnaces.

In the production of sodium oxid from sodium sulfate, the secondary, or CO combustion, is not used. The gases from the $CO_2$ chamber are so regulated that the complete combustion of the fuel for the purpose of liberating substantially all the heat units is carried on and so regulated that an excess of oxygen is present in the kiln. In this case, lime is added and the following reactions occur: the sulfur in the sodium sulfate leaves the sodium and combines with the lime for which it has a greater affinity and forms calcium sulfid, the excess oxygen furnished the $CO_2$ gases being present in sufficient quantities to unite with the sodium to form sodium oxid.

My apparatus insures perfect regulation of fuel and air to meet conditions required in the application thereof to any installation.

The processes disclosed herein are claimed in another application executed of even date herewith.

What I claim is:

1. A furnace for the reduction of ore, conversion of chemical compounds, or treatment of material comprising a container for the charge of ore, chemical compound, or material, and primary and secondary combustion chambers independent of each other which independently communicate with said container for the independent delivery thereto of the gases evolved in said chambers, means for effecting the substantially complete combustion of fuel and air in the primary chamber before delivery therefrom to the container for the ore, and means for carrying on partially complete combustion in the secondary combustion chamber with production of excess carbon therein before delivery therefrom to the container for the ore, the products of combustion being utilized in the container to effect reduction of the ore conversion of the chemical compound, or treatment of the material as the case may be.

2. A furnace or kiln provided with primary and secondary combustion chambers independent of each other which independently communicate with the interior of the furnace for the independent delivery thereto of the gases evolved in said chambers, means for regulably and proportionately introducing finely divided fuel and streams of air into the primary combustion chamber and effecting the complete combustion thereof before delivery therefrom to the container for the ore, the product of which is utilized to heat the furnace or kiln, and means for regulably and proportionately introducing streams of air and finely divided fuel into the secondary combustion chamber and effecting partial combustion thereof with an excess of carbon before delivery from the secondary combustion chamber, the products of combustion being utilized in the treatment of the material in the furnace or kiln.

3. A furnace for the smelting of iron, lead, and other ores, having separate primary and secondary combustion chambers independently communicating with the charge-holder or container, means for developing and carrying on substantially complete combustion in the primary combustion chamber independently of combustion in the secondary chamber, and means for developing and carrying on partially complete combustion in the secondary combustion chamber, with production of an excess of carbon independently of combustion in the primary chamber, the products of combustion developed in said chambers flowing independently to the charge holder or container.

In testimony whereof I affix my signature.

ROBERT JAMES ANDERSON.